United States Patent [19]

Wheeler et al.

[11] 4,426,185
[45] Jan. 17, 1984

[54] FEEDER FOR PARTICULATE MATERIAL

[75] Inventors: Eric Wheeler; Gerald F. Arthur, both of Stroud, England

[73] Assignee: Redler Conveyors Limited, England

[21] Appl. No.: 212,853

[22] Filed: Dec. 4, 1980

[30] Foreign Application Priority Data

Dec. 21, 1979 [GB] United Kingdom ................ 7944290

[51] Int. Cl.³ .............................................. B65G 19/10
[52] U.S. Cl. .................................. 414/196; 414/299; 198/735; 198/861
[58] Field of Search ................ 198/735, 861; 414/172, 414/196, 217, 271, 288, 299

[56] References Cited

U.S. PATENT DOCUMENTS 2,564,599  8/1951  Hapman .............................. 198/735
3,135,651  6/1964  Starrett .............................. 198/735

Primary Examiner—Richard A. Schacher
Attorney, Agent, or Firm—Ostrolenk, Faber, Gerb & Soffen

[57] ABSTRACT

A feeder comprising in combination a vessel (10) of substantially circular cross section that contains an en-masse conveyor (11) that is constrained to pass through a trough (16₁, 16₂) spaced from the internal wall of said vessel so that material being conveyed from an inlet (10₁) in said vessel (10) to an outlet (14₂) in said vessel (10) by said conveyor does not come into rubbing contact with said wall.

13 Claims, 7 Drawing Figures

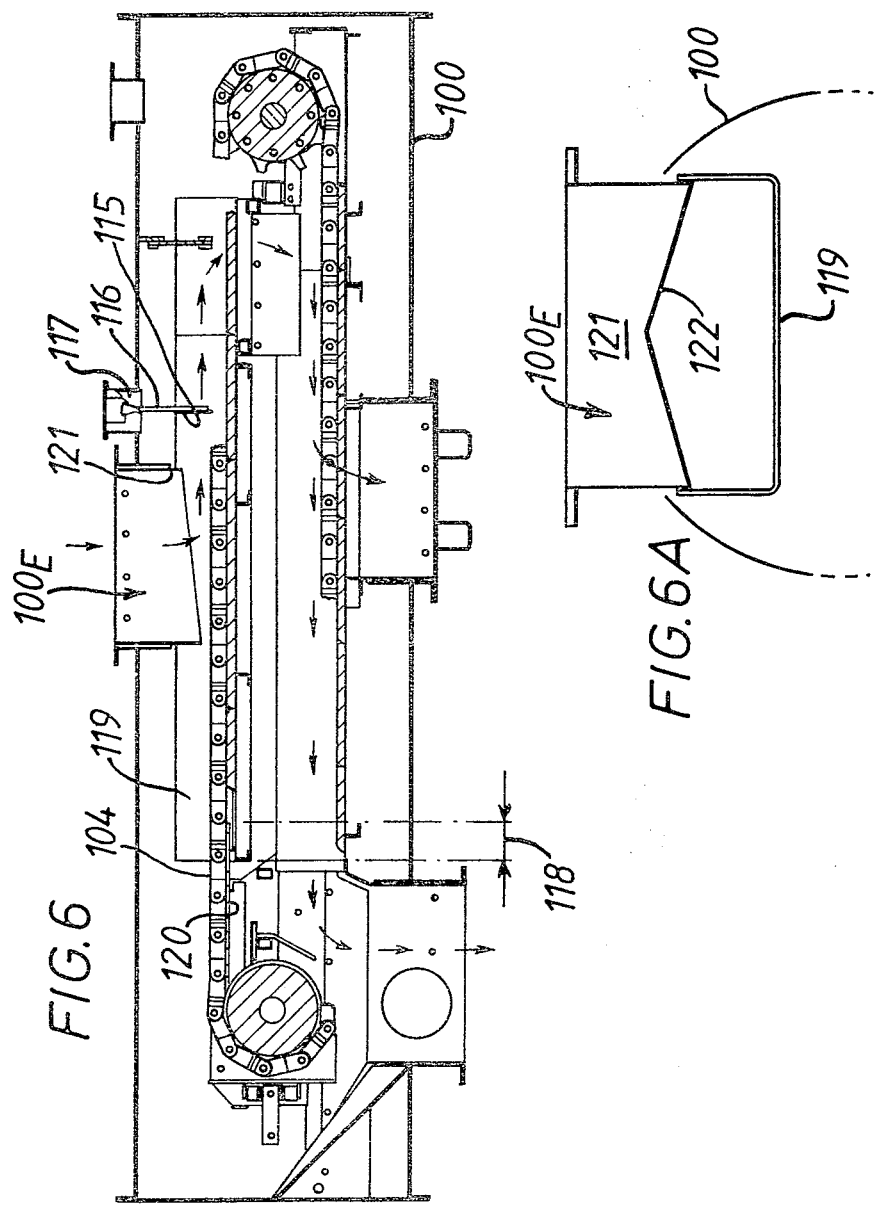

FEEDER FOR PARTICULATE MATERIAL

DESCRIPTION

This invention relates to a feeder for use primarily with particulate materials and is especially directed to a coal feeder for conveying coal from overhead bunkers to coal mills at power stations.

It is a requirement of such a feeder that it be able to operate at an internal pressure above that of the atmosphere and that it can contain the pressure from an explosion within the coal mill system. In a coal feeder, for example, it may be required to contain a pressure of at least 0.34 N/mm$^2$ (about 50 lb./sq. in).

According to the present invention there is provided a feeder comprising in combination a vessel of substantially circular cross section that contains an en-masse conveyor that is constrained to pass through a trough spaced from the internal wall of said vessel so that material being conveyed from an inlet in said vessel to an outlet in said vessel by said conveyor does not come into rubbing contact with said wall.

The vessel is preferably a right cylinder of circular section that may conveniently be made to withstand an internal pressure of 0.034 N/mm$^2$.

En-masse conveyors are well known employing open moving flights and the constraint is that peculiar to dynamics or to restrict the motion of a body to a certain course e.g. along a fixed line or curve.

The invention will be more fully understood from the following description given by way of example only with reference to the figures of the accompanying drawings in which:

FIG. 6 is a sectional elevation of another construction of feeder and FIG. 6A is a detail of the right hand feeder plate, of FIG. 6, seen in end view.

Figure 1:
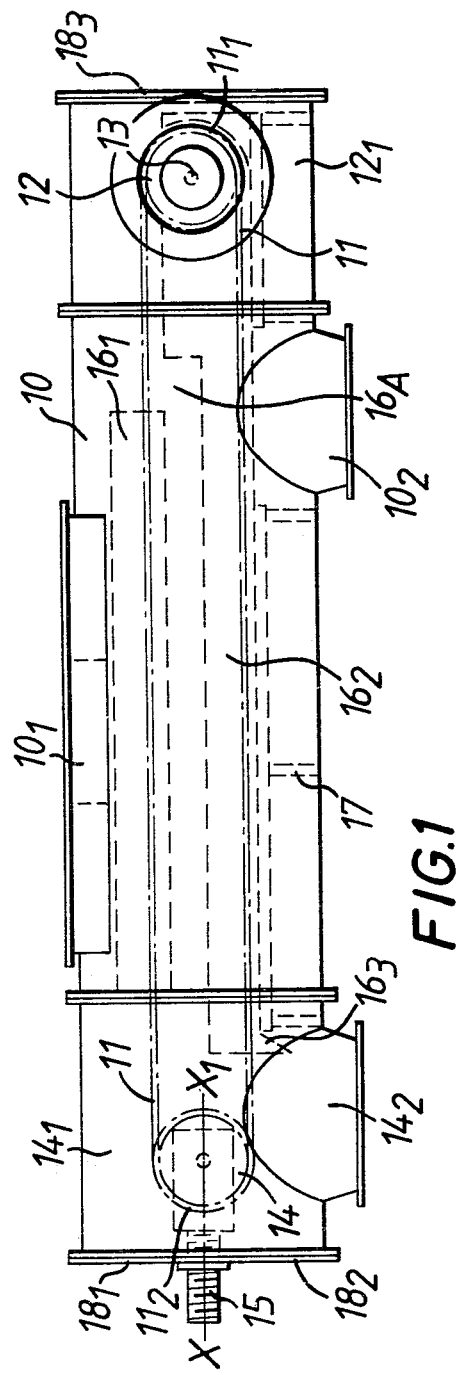
FIG. 1 is a side elevation of a feeder for conveying coal to a mill and FIG. 2 an end elevation.
Figure 2:
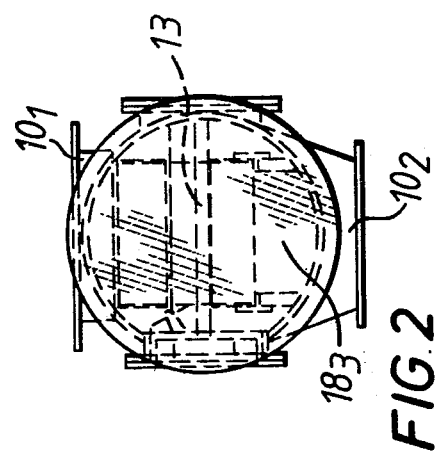

In the FIGS. 1 and 2 of the drawing, a right cylindrical tube 10 of circular cross section provides, together with end parts $12_1$, $14_1$, a robust single vessel of circular cross section housing an en masse conveyor for moving particulate coal via its submerged flights (not shown) of a conveyor chain 11 that is driven by a driving sprocket 12 carried by a shaft 13 in suitable bearings (not shown) in end part $12_1$ and operated by a prime mover (not shown) generally an electric motor through reduction gears (not shown). The chain 11 is continuous and co-operates with a tensioning wheel 14 in bearings (not shown) in end part $14_1$, which wheel 14 can be reciprocated along line $XX_1$ by tensioning means shown diagrammatically at 15.

The chain 11 has its two ends $11_1$, $11_2$ wholly within the robust vessel that is able to contain any high pressure that is generated within itself or within the system to which it is attached should an explosion occur, which in practice may cause a pressure rise to 0.034 N/mm$^2$. The coal enters the vessel 10 at an inlet $10_1$ and an emergency exit is provided at $10_2$. A final outlet $14_2$ is provided in the end part $14_1$.

Inside the vessel 10 are two troughs $16_1$, $16_2$ one above the other and supported by suitable structure 17, so that the internal wall surface of the vessel 10 is not abraded by the passage of the coal since the coal does not come into rubbing contact with the wall of the vessel. Both troughs $16_1$, $16_2$ are readily replaceable. Trough $16_2$ overlaps trough $16_1$ at 16A so that coal being moved to the right of the drawing by the flights of the top run of the chain falls from trough $16_1$ at 16A into trough $16_2$ and then moves to the left in the drawing by virtue of the flights of the lower run of the chain to final outlet $14_2$. The trough $16_2$ at the final outlet $14_2$ has an exit chute $16_3$. Both ends of the vessel 10 are provided with hinged doors $18_1$, $18_2$, $18_3$ on suitable end plates.

It will be readily understood that the shaft assembly for the sprocket wheel 12 that co-operates with the chain may be inserted into its appropriate end via flanged stools and that the bearings and seals may conveniently be placed in flanged plugs.

The strength of the robust cylindrical vessel comes by and large from its circular section but where entry or exit apertures are cut into it, the strength is mainted by flanges and stiffeners or other suitable means.

It may be necessary to eliminate the void space between the troughs $16_1$ and $16_2$ and the vessel 10 wherever possible to prevent accumulations of dust. This may be achieved by filling the space with a flame retardant foam, the foam being placed in position after the feeder had been installed in its working situation. A feature of the foam is that it would readily deform at pressure significantly higher than the normal operating pressure, so that the vessel 10 would be uniformly loaded in the event of an explosion in the connected system.

Figure 3:
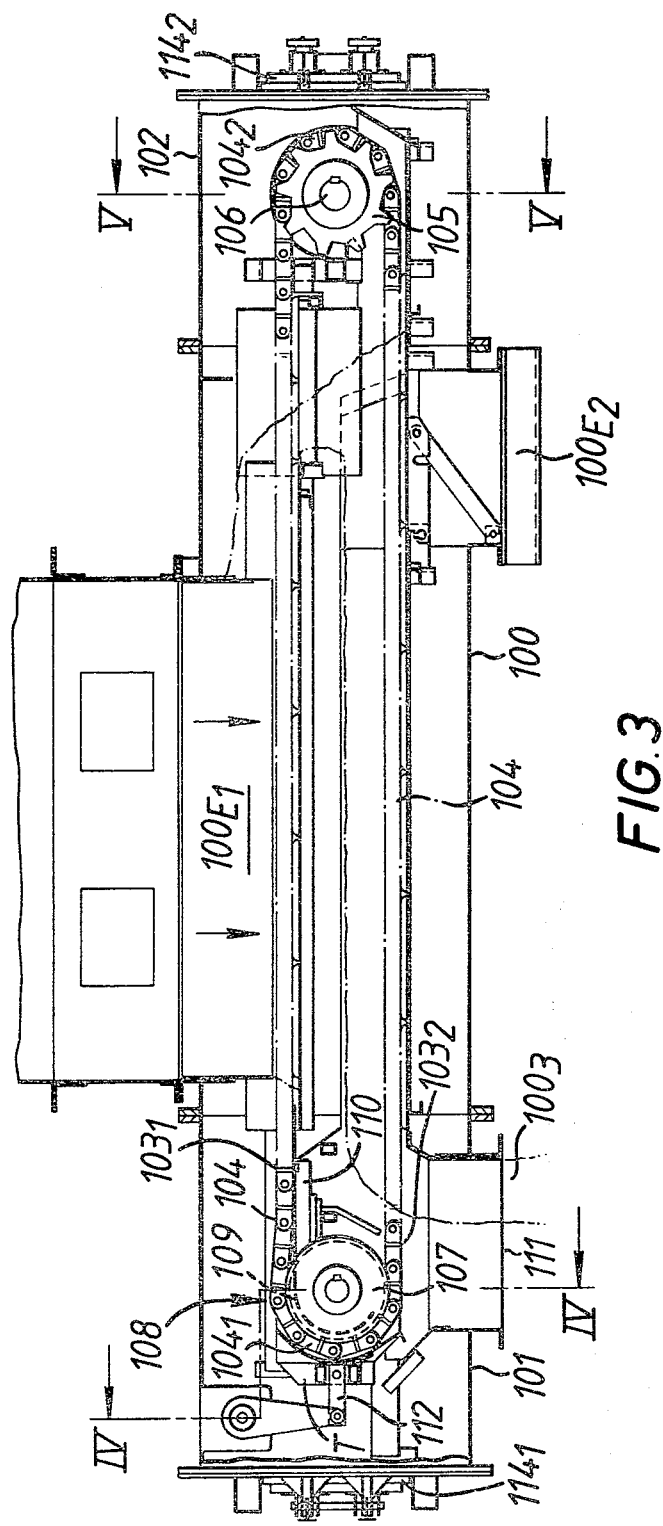
FIG. 3 is a sectional elevation of a more advanced construction of feeder.
Figure 4:
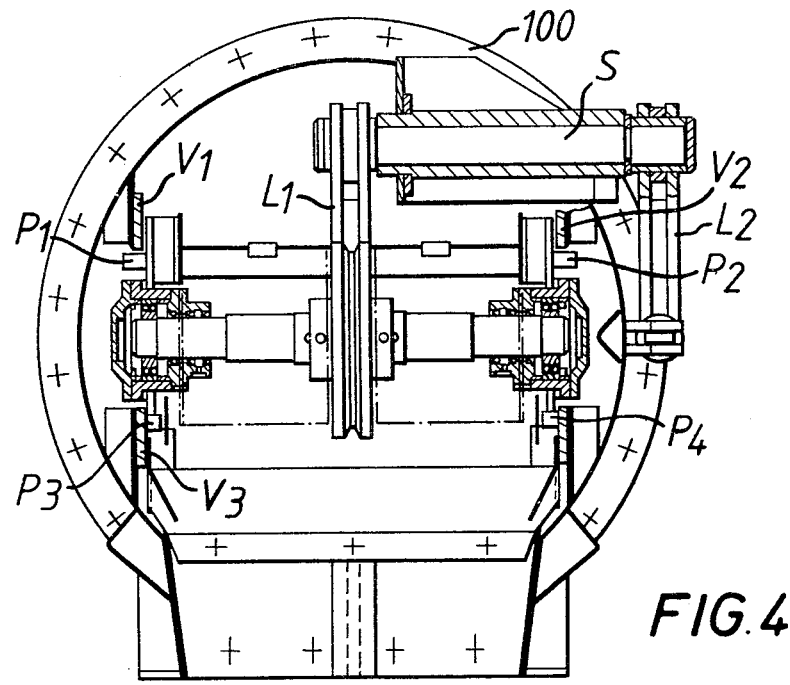
FIGS. 4 and 5 are sections on section stations IV IV and V V respectively taken on FIG. 3.
Figure 5:
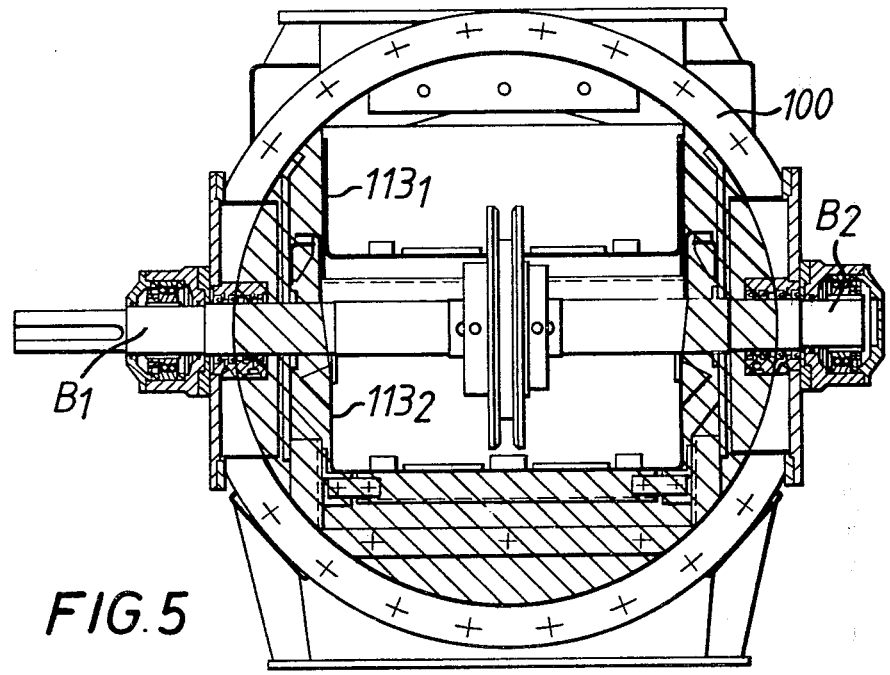

Referring now to FIGS. 3, 4 and 5 there is shown a feeder similar to that shown in FIGS. 1 and 2. A right cylindrical tube 100 of circular cross section provides with end parts 101, 102 a robust single vessel of circular cross section housing an en masse conveyor for moving particulate coal via submerged flights such as $103_1$, $103_2$ of a conveyor chain 104 that is driven by a driving sprocket 105 carried by a shaft 106 in suitable bearings $B_1$, $B_2$ (FIG. 5) in end part 102 and operated by a prime mover (not shown) generally an electric motor through reduction gears (not shown). The conveyor chain 104 is continuous and co-operates with a trailing tensioning wheel 107 in bearings (not shown) in end part 101 which tensioning wheel 107 can be reciprocated by a tension end assembly shown generally at 108 and comprising two vertical side plates spaced apart by transverse members, one member 109 being of trough section having a curved end shaped to coincide with the passing of the chain 104 and flights 103 around the tensioning wheel 107 the other end 110 of the trough overlapping the trough 109 so as to provide a return path for material not falling off the chain as it passes over the outlet 111.

The tension end assembly 108 is supported from fixed members inside the vessel, the vertical side plates resting on circular pins $P_1$, $P_2$ etc. projecting from the fixed members. Upward movement of the tension end assembly is prevented by circular pins at the top of the vertical side plates $V_1$, $V_2$ which are in close proximity to the bottom edge of fixed members above. This construction eliminates the problems associated with the usual forms of support, which can fill with material and prevent horizontal movement.

At least one of the transverse members is connected to the tensioning means, by a link 112, the arrangement being such that having removed the end cover, the link can be taken off and the tension end assembly can be withdrawn from the end part, so that maintenance can be carried out in comfort.

The tensioning means is fixed at the side of the vessel 100, a shaft 5 having similar levers $L_1$ $L_2$ at each end, passing into the vessel through a housing, the lever $L_1$ inside being connected by the link 112 to the tension end assembly T the lever outside being connected to the tensioning means. In this way internal access to the end part is possible with the tensioning gear operational.

The chain 104 has its two ends $104_1$, $104_2$ wholly within the robust vessel 100 that is able to contain any higher pressure that is generated within itself or within the system to which it is attached should an explosion occur, which in practice may rise to 0.034 N/mm². The coal enters the vessel 100 at an inlet $100_{E1}$ and an emergency exit is provided at $100_{E2}$. A final outlet $100_3$ is provided as shown. The inlet $100_{E1}$ may have a down stream end so formed as to control the depth of coal moved by the en masse conveyor, by which means the rate at which the coal is conveyed is regulated.

Inside the vessel 100 are two troughs $113_1$ $113_2$ one above the other and supported by suitable structure, so that the internal wall surface of the vessel 100 is not abraded by the passage of the coal since the coal does not come into rubbing contact with the wall of the vessel. Both troughs are readily replaceable. In FIG. 5 the area shaded in heavy lines represents a volume filled with flame retardant foam. Hinged doors $114_1$, $114_2$ are provided at each end of the feeder and suitable glands are also provided where essential.

In the construction of FIGS. 6, 6A a flap 115 is arranged at one end of the pivoted arm 116 the other end of the arm is formed into an actuator for a proximity type switch 117. When the coal flows from the bunker through the inlet 100E, and is conveyed at the correct depth by the conveyor chain 104 the flap 115 rides on the top surface of the coal, holding the actuator away from the switch.

A reduction or cessation of coal flow will allow the actuator to move near to the proximity switch 117, giving a signal that a change has occured.

The right hand end plate 121 of the inlet 100E offers a shaped area to the material being fed by the chain 104. The shape is an inverted V (FIG. 6A) 122 which is higher at the centre than at the outside edges. Thus the material above the chain is controlled in its area of inlet by the end plate 121 and this can be calculated for any given material to respond to its angle of repose in the upper trough 119.

Another refinement consists in the formation of the trough 120 that extends backward (to the right) from the curved end over the upper trough 119 a distance shown by arrows 118 from the curved end to the end marked 121. This trough 120 is fixed between the vertial plates of the tension end assembly so as to be some twelve millimeters above the trough 119.

The trough 120 is drawn in the mid position and it can move from this position under the influence of the tensioning gear to the position of maximum chain centres as the chain links and joint pins wear. One or more links will then be taken out of the chain, and the assembly moved to a new position. The movement is about one hundred and fifty millimeters total, and at all times the end of the trough 120 is above the trough 119, so that coal elevated around the curved end would drop from the end into the trough 119.

It will be clear from the above that the feeder has an ability to deal with 'overcarry' since the top trough is so formed as to provide a return path for particulate material not falling through the outlet.

We claim:

1. A feeder, comprising:
   a substantially cylindrical vessel;
   top and bottom troughs located in said vessel one above the other;
   an en-mass conveyor associated with said troughs for conveying articles on said top trough in a first direction and articles on said bottom trough in a second direction;
   an inlet formed in said vessel through which material to be conveyed can enter said vessel and land on said top trough wherein it is engaged by said conveyor and is moved in said first direction toward a first end of said trough;
   said top and bottom troughs being juxtaposed such that material pushed off said first end of said top trough by said conveyor falls onto said bottom trough wherein it is engaged by said conveyor and moved in said second direction toward said first end of said bottom trough;
   an outlet formed in said vessel through which material pushed off said first end of said bottom trough can exit said vessel; and
   said troughs being spaced a sufficient distance from the walls of said vessel that material moved over said troughs by said conveyor do not come into contact with, and therefore do not abrade, said walls.

2. The feeder according to claim 1, wherein said first direction is opposite to said second direction.

3. The feeder according to claim 1, wherein said troughs are spaced from said side walls only by air.

4. The feeder according to claim 1, wherein said vessel has hinged doors at each of its two ends.

5. The feeder according to claim 1 wherein moving parts that enter or leave the vessel pass through sealing glands.

6. The feeder according to claim 1 when the vessel can withstand an internal pressure of at least 0.34 N/mm² (about 50 lb./sq. inch).

7. The feeder according to claim 1 wherein the en-masse conveyor is a chain and flight conveyor.

8. The feeder according to claim 1 wherein the en-masse conveyor is tensioned by a shaft link and lever assemble actuable in combination to extend the length between the ends of said conveyor.

9. The feeder according to claim 7 or 8 wherein the top trough is so formed as to provide a return path for material not falling off the chain as it passes over the outlet.

10. The feeder according to claim 7 or 8 wherein the inlet is so formed as to control the depth of material above the top run of the conveyor chain.

11. The feeder according to claim 10 wherein the inlet has an outlet plate shaped to give the material a V shape predetermined to agree substantially with the angle of repose of said material.

12. The feeder according to claim 1 wherein a mechanism is provided to give a signal when the flow of material from the inlet fails.

13. The feeder according to claim 12 wherein the mechanism comprises a pivoted flap that co-operates with the upper surface of the material and a proximity electric switch.

* * * * *